(12) United States Patent
Grosberg

(10) Patent No.: US 10,360,363 B1
(45) Date of Patent: *Jul. 23, 2019

(54) SYSTEM AND METHOD FOR VERIFIED ADMISSION THROUGH ACCESS CONTROLLED LOCATIONS USING A MOBILE DEVICE

(71) Applicant: Mark Y. Grosberg, Boca Raton, FL (US)

(72) Inventor: Mark Y. Grosberg, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,451

(22) Filed: Apr. 2, 2015

(51) Int. Cl.
 *G06F 21/34* (2013.01)
 *G06F 16/245* (2019.01)

(52) U.S. Cl.
 CPC ............ *G06F 21/34* (2013.01); *G06F 16/245* (2019.01)

(58) Field of Classification Search
 CPC ... G06F 21/34; G06F 17/304; G07C 9/00103; G07C 9/00571; G07C 9/00904; H04M 12/08
 USPC ....................................................... 726/2, 20
 See application file for complete search history.

(56) References Cited

U.S. PATENT DOCUMENTS

| | | | |
|---|---|---|---|
| 6,513,119 B1 | 1/2003 | Wenzel | |
| 7,119,674 B2 | 10/2006 | Sefton | |
| 7,222,241 B2 | 5/2007 | Milgramm et al. | |
| 7,377,426 B1 | 5/2008 | Makeever | |
| 7,441,004 B2 | 10/2008 | Lue Chee Lip et al. | |
| 8,040,216 B2 | 10/2011 | Jordan et al. | |
| 8,058,971 B2 | 11/2011 | Harkins et al. | |
| 8,254,631 B2 | 8/2012 | Bongard | |
| 8,671,143 B2 | 3/2014 | Lewis | |
| 8,787,886 B2 | 7/2014 | Jonsson | |
| 2005/0114192 A1 | 5/2005 | Tor et al. | |
| 2005/0119052 A1* | 6/2005 | Russell | A63F 13/12 463/42 |
| 2007/0248219 A1 | 10/2007 | Foster et al. | |
| 2007/0287413 A1* | 12/2007 | Kleitsch | H04L 12/14 455/405 |
| 2010/0211649 A1* | 8/2010 | Dimas | G06Q 10/107 709/206 |

(Continued)

FOREIGN PATENT DOCUMENTS

WO      WO2013034671 A1     3/2013

*Primary Examiner* — Ashokkumar B Patel
*Assistant Examiner* — William B Jones
(74) *Attorney, Agent, or Firm* — Hanrahan Law Firm, P.A.; Benjamin M. Hanrahan

(57) ABSTRACT

A system and method for verifying entry credentials and activating/deactivating an access control system via use of the native capabilities of a mobile device is disclosed herein. Particularly, the system and method include an embedded local control device attached or communicative with an electronic gate or lock. The control device is communicative with a remote access control management system, which is structured to receive, track and manage access tokens that can be used to control access to a gated community or other secured location. Notifications that an access token has been generated can be communicated to the guest(s) by way of text message, short message service (SMS), or email, for example. Each notification may contain a unique link to a webpage employing the access token. While in the geographic vicinity of the secured location, the guest may actuate the access token and open the gate.

16 Claims, 10 Drawing Sheets

(56) References Cited

U.S. PATENT DOCUMENTS

| | | | |
|---|---|---|---|
| 2010/0223170 A1* | 9/2010 | Bahar | E05B 19/0005 |
| | | | 705/34 |
| 2010/0306549 A1 | 12/2010 | Ullmann | |
| 2011/0012732 A1 | 1/2011 | Farkash et al. | |
| 2012/0188054 A1* | 7/2012 | Bongard | G07C 9/00309 |
| | | | 340/5.61 |
| 2012/0297190 A1* | 11/2012 | Shen | H04L 9/0866 |
| | | | 713/168 |
| 2013/0017812 A1 | 1/2013 | Foster | |
| 2013/0031611 A1 | 1/2013 | Barreto | |
| 2013/0048720 A1 | 2/2013 | Lewis | |
| 2013/0057695 A1 | 3/2013 | Huisking | |
| 2013/0214041 A1 | 8/2013 | Wright | |
| 2013/0257590 A1 | 10/2013 | Kuenzi et al. | |
| 2013/0292467 A1 | 11/2013 | Avs et al. | |
| 2014/0085087 A1* | 3/2014 | Alnadwi | G07C 9/00309 |
| | | | 340/542 |
| 2014/0232522 A1 | 8/2014 | Schmidt-Lackner et al. | |
| 2015/0278548 A1* | 10/2015 | Brands | G06F 21/6245 |
| | | | 726/9 |

\* cited by examiner

Create Invitation / Access Token

Welcome [resident], please enter your guest's information below:

42 {
Guest Name: [_____]
Guest Phone Number: [_____]
Guest E-Mail Address: [_____] ← 44

Choose Location: [⬇ Gate One]

Arrival Time: [_____] ← 43

Method of Invitation Delivery: ← 45
    [ ] SMS / Text Message
    [ ] E-Mail
}

[SUBMIT Invitation]

FIG. 4

SYSTEM AND METHOD FOR VERIFIED ADMISSION THROUGH ACCESS CONTROLLED LOCATIONS USING A MOBILE DEVICE

FIELD OF THE INVENTION

The present invention is directed to a system and method for verifying entry credentials and activating/deactivating an access control system via use of a mobile device in order to permit ingress or egress there through. The access control system may include a gate, such as a vehicle gate positioned at an entrance/exit of a residential community, parking garage, etc. Other embodiments of the access control system may include locked doors, entryways, walkways, lobby doors, electronic door strikes, etc. Furthermore, certain embodiments of the present invention may be implemented using only the native applications or capabilities of a guest's device or smartphone, such as the native messaging services (text messages, SMS, email), native web browser, global positioning system, etc., such that additional software, application(s), or third-party program(s) need not be downloaded or installed on the guest device.

BACKGROUND OF THE INVENTION

A number of residential and commercial communities throughout the United States and Worldwide employ secure access gates, for example, at the entrance thereof. For instance, many of these communities include manned security or an electric gate to limit access or entry to the residents and their guests. Particularly, guests typically enter a gated or secured community by interacting with a security guard who confirms the guest is allowed entry, e.g., via a precompiled list of authorized guests or by contacting the resident and confirming the guest is authorized for entry. Another manner in which guests may typically enter a gated or secured community may be by using an electronic device positioned at or near the gate which can call the resident or home owner, who then signals using, for example, dual-tone multi-frequency (DTMF) signaling that the gate should open.

These approaches have some significant drawbacks. For example, in the situation with the guard, it takes time for each resident to interact with the guard, potentially increasing the wait time for the guests. In addition, the guard must confirm that the driver is the intended guest, for example, by checking identification or other documents that could potentially be forged or fictitious.

With regard to the electronic systems, when a household has multiple residents, the system oftentimes does not work or function as intended, as each resident will typically have their own mobile phone number, and there is no guarantee that the number programmed in the electronic device or "call box" is accurate, up-to-date, or will reach the intended recipient. Some systems may even require that the household include a dedicated plain old telephone service (POTS) line. Furthermore, the call boxes and electronic systems often have poor audio quality and performance rates. Additionally, the driver or guest must open his or her vehicle window to interact with the system, thereby exposing himself or herself to the outer elements, often an inconvenience during inclement weather.

Moreover, advanced cellular telephones, often referred to as smartphones, with inherent or native global positioning system (GPS) capabilities, are ubiquitous in society today. Thus, it is contemplated that smartphones may be used in the process of validating guests and providing access to guests into secured locations, such as through vehicle gates at residential communities. However, systems that may require guests and/or residents to download and install third-party or non-native applications, programs, or other software on the smartphone will likely cause the system to be less universal, more complicated in its use, and therefore, more likely to fail.

There is thus a need in the art for a system and method that can operate to manage invitations or access tokens corresponding to a guest or a guest's smartphone, for example. A website or webpage accessible by the guest's native smartphone web browser may be provided to authorize a guest to enter the community. Particularly, once an invitation is generated, an SMS or email may be communicated to the guest's smartphone with a unique link to a webpage. When the guest is within a proximate location or defined vicinity of the community (as determined by the native GPS capabilities of the smartphone), the guest can open the webpage and activate and open the gate.

Advantageously, the link or webpage may also include driving directions or a map (e.g., using Google Maps™ or Apple Maps™), as well as resident contact information (e.g., phone number, email address, etc. relating to the resident). A remote access control management system may store a detailed log of exactly when the gate was opened and for which resident(s). The resident(s) does not have to be home or in the vicinity for the guest to activate or open the gate. Furthermore, the access token or invitation, initiated via the SMS or email, may include a time parameter or time window of validity. Certain parties or entities (e.g., maintenance crew, management, delivery services such as UPS, FedEx, USPS, maids, pool cleaning crew, lawn care crew, etc.) may be provided access tokens which can be allowed for specific times of the day, certain days, and can be revoked at any time.

Additionally, the guest may forward the invitation or notification (SMS or email) to another device, for example, if the guest's plans change. Other embodiments may only validate the access token if activated by a particular authorized smartphone, phone number, or device. In addition, at least one embodiment of the present invention may include a one-time pass, meaning that the token or invitation may only be activated a single time. The one-time pass or one-time token may still include a time parameter, although once the token is activated by the guest, it can no longer be activated again. This prevents the guest from opening the gate or lock multiple times throughout the time parameter or time window, for example, in order to let other, non-authorized vehicles or parties through the gate. Of course, other implementations may include a frequency parameter greater than one, meaning that the resident, or other party who creates the token, can specify how many times the token can be activated within the particular time parameter(s).

Other advantages include reduced man power and expense for guest entry in that guard personnel workload is significantly reduced, and guests need not open the car window and expose themselves to the outer elements to gain access to the community.

SUMMARY OF THE INVENTION

As described herein, the present invention is directed to a system and method for verifying entry credentials and activating/deactivating an access control system via use of a mobile device in order to permit ingress or egress into a gated community or locked door, for example. Certain embodiments include an embedded computer system or control device that is structured and configured to actuate an electronic gate or lock (e.g., by way of a dry contact relay). The control device is capable of utilizing a secure Internet (TCP/IP) or other network connection, such as SMS, to communicate with and receive commands from a remote access control management system, such as one or more web servers with one or more databases or other storage capabilities.

The remote access control management system of the various embodiments is structured to receive, track and manage invitations or access tokens that can be used to control access to the gated community or other secured area. Notifications that an access token has been generated can be communicated to the guest(s) by way of text message, short message service (SMS), or email, for example. Each notification may contain a unique or entropic link or uniform resource locator (URL) to a webpage or website containing information related to the access token. The information may include, for example, specific time parameters within which the access token is valid, location parameters (e.g., the location of the gate or community), instructions on how to access or enter the community, contact information for the resident who initiated the invitation, etc. In addition, a map may be provided to show the location of the gate and/or the guest's current location.

When the guest is within the vicinity of the gate or community, for example, as determined by the native GPS capabilities of the smartphone, and if the time is within the specific time parameters of the access token, the guest may activate the access token to open the gate. Upon doing so, the remote access control management system will communicate an access command to the local control unit or device and log the activity. In certain embodiments, the smartphone or guest device will not communicate directly with the local control unit or computer system. Rather, the gate will only open when the remote access control management system sends an appropriate command. It should be noted, however, that the system and method may be implemented in order to allow direct communication between the guest device and the local control unit.

Furthermore, some embodiments may also generate and/or communicate a notification to the resident (or other authorized party) in order to indicate when the token is activated, for example, when the guest activates the token to open the gate and gain entry to the community. The notification may be via SMS, email, push notification, etc.

It should also be noted that certain embodiments of the present invention may be implemented using only the native applications or capabilities of a guest's device or smartphone, such as the native messaging services (text messages, SMS, email), native web browser, global positioning system, etc., such that additional software, application(s), or third-party program(s) need not be downloaded or installed on the guest device.

These and other objects, features and advantages of the present invention will become more apparent when the drawings as well as the detailed description are taken into consideration.

BRIEF DESCRIPTION OF THE DRAWINGS

FIG. 4 is an exemplary schematic screenshot of the system of the present invention wherein a resident may initiate or create an invitation or access token.

Like reference numerals refer to like parts throughout the several views of the drawings provided herein.

DETAILED DESCRIPTION OF THE INVENTION

Figure 1A:
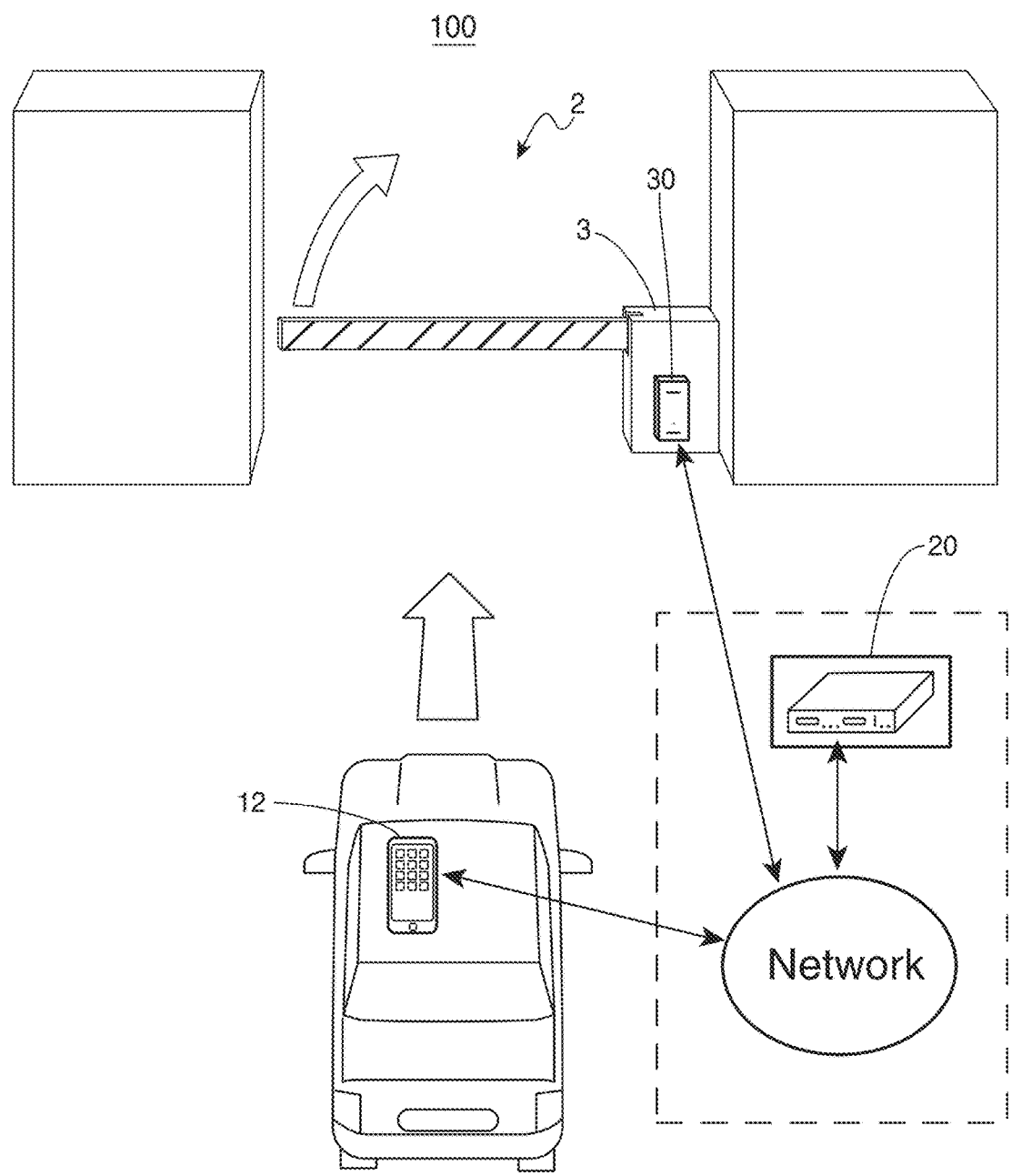
FIG. 1A is a schematic representation of the system as disclosed in accordance with at least one embodiment of the present invention implemented in connection with an exemplary vehicle gate.

As shown in the accompanying drawings, the present invention is directed to a system 100 and method 200 for verifying admission through an access controlled location 2, including, but in no way limited to a vehicle gate (FIG. 1A), doorway (FIG. 1B), etc. Briefly, a resident or other authorized party may initiate the creation of an invitation or access token for a particular guest. The access token or invitation of certain embodiments may specify a guest or guest device and other access credentials or verification parameters such as a date, time, and location. The guest may retrieve the access token, prior to or upon arrival at the location, for example, via the guest device (e.g., smartphone or tablet). Upon verification of the access token, including the verification parameters (e.g., location and time), the guest may be granted access into the location.

Specifically, the various embodiments of the present invention include an access control management system, generally referenced as 20, which, as described herein, is structured and configured to receive requests for creating access tokens, generate and store access tokens, and communicate with the guest device(s) 12 and a gate, lock or other control device 30 for providing access to the location 2. Furthermore, in certain embodiments, the access control management system 20 may be positioned remotely from the location 2 wherein communication between the guest device 12 and the control device 30 may be conducted via a communication network 15, including, but in no way limited to the TCP/IP, World Wide Web, Internet, Wide Area Network, cellular or telecommunication network(s) such as 3G, 4G, LTE, SMS, etc. It is contemplated, however, that in certain embodiments, the access control management system 20 may be disposed locally to the location 2, such that communication with the control device 30 or gate, lock, etc. may be provided by short range communication channels, Bluetooth, WiFi, local area networks, NFC, etc.

Figure 2:
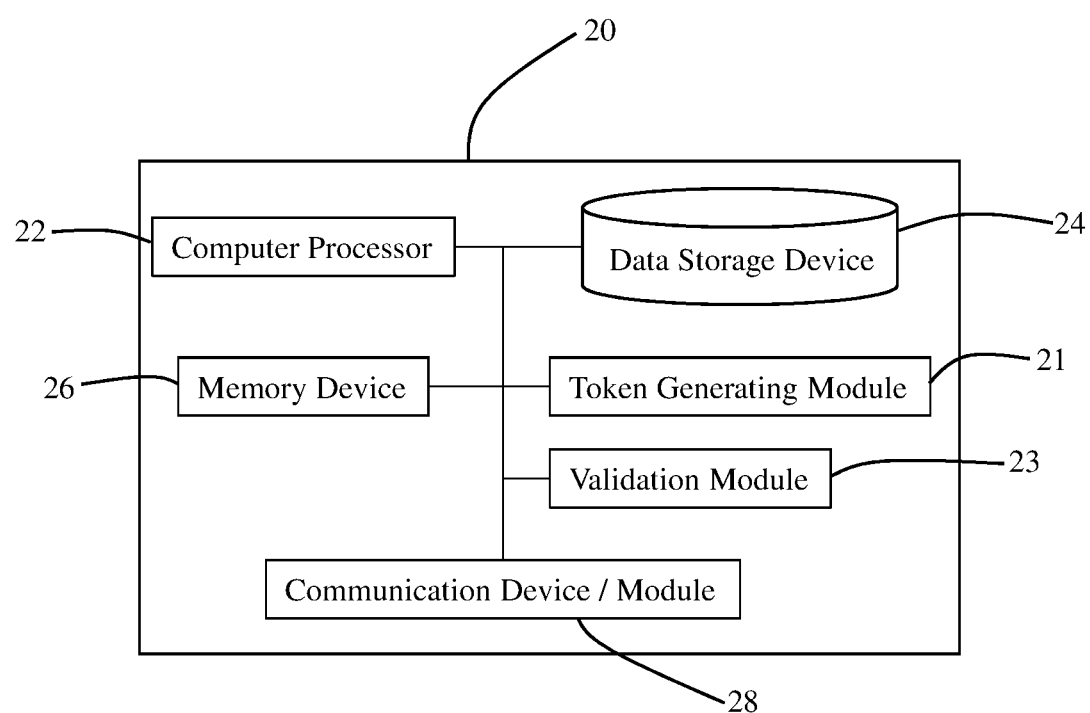
FIG. 2 is a block diagram of the remote access control management system and at least some of the components thereof as provided in accordance with at least one embodiment of the present invention.

Further, referring to the schematic of FIG. 2, the access control management system 20 of at least one embodiment of the present invention may include a computer processor 22, data storage device 24, memory 26, one or more communication devices or hardware 28 (e.g., network device(s), web server(s), etc.) Particularly, the access control management system 20 and/or processing device of at least one embodiment of the present invention comprises one or more web servers or data servers, including software and hardware to receive requests and to communicate data, information, media, web pages, applications, commands, SMS messages, text messages, email messages, etc. via the network 15 in accordance with the present invention.

More in particular, the computer processor 22 may include, for example, any device cooperatively structured to execute or implement computer instructions, software, etc. The data storage device 24, as used herein, may include one or more internal, external or removable hard disk drives, CD/DVD, USB drives, solid state drives, virtual drives, could-based storage drives, or other types of volatile or non-volatile memory. A relational or other database may be implemented on or within the one or more storage devices 24 of the present invention, for example, in order to store and retrieve various information or data corresponding to access tokens as described herein. Further, the memory device 26, may include but is not limited to random access memory (RAM) or other like devices configured to implement the present invention in the intended manner, for example, by at least temporarily storing and assisting with the execution of one or more applications or computer programs capable of implementing the system 100 and method 200 described herein. Moreover, the communication device 28 may include a network communication hardware/software component or module structured to facilitate communication between the guest device(s) 12, control device 30, and/or a resident or other authorized device (not shown), for example, in order to receive a request to create an invitation or access token.

Figure 3:
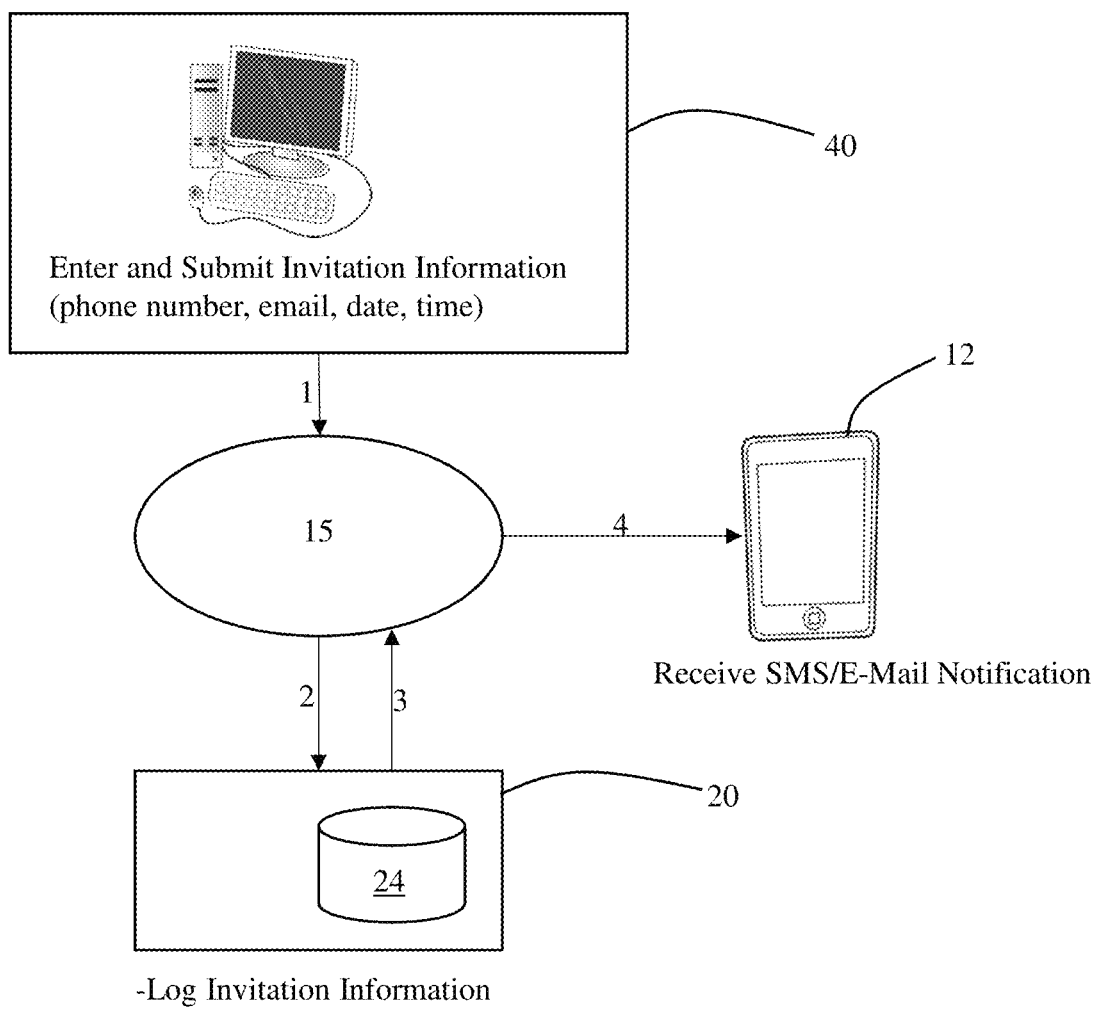
FIG. 3 is a schematic diagram illustrating the system of at least one embodiment and the creation of an invitation or access token.

Referring now to FIG. 3, and as generally referenced at 40, the system 100 and/or method may be initiated, for example, when an initiating party, such as a resident, security personnel, or other authorized party requests that an invitation or access token be generated. Accordingly, the system 100 of at least one embodiment comprises a token generating module, generally referenced as 21 in FIG. 2, for receiving a request to create a guest access token and for generating the guest access token. The token generating module 21 may comprise a computer program, application, software or series of computer instructions cooperatively configured to receive information corresponding to the access token and for generating the access token, as provided herein.

Particularly, in at least one embodiment, a resident or other authorized party may provide various invitation information 42 (e.g., as shown in FIG. 4) corresponding to the particular guest access token to be generated. In certain embodiments, the initiating party may need to be pre-registered with the system 100 or method 200 of the present invention such that the party's authorization to request guest access tokens in accordance with the present invention may be verified. For example, as a resident, management personnel, security officer, etc. of a cooperating community, building, or other location 2, the party may be verified to provide or request guest access tokens. In this regard, the party may, in some implementations, need to pre-register with the system 100 or method 200 or otherwise sign up for or generate a user profile.

In order to request a guest access token or invitation, in at least one embodiment of the present invention, the initiating party may visit a webpage, for example, via a web browser on a computer, laptop, smartphone, mobile device, tablet, etc. Other embodiments may include an application, software or other program, whether installed on the party's device (e.g., computer, laptop, smartphone, mobile device, tablet, etc.) or accessible thereby, which may be used to submit a request to generate an access token, as shown at 40, for example, in FIG. 3.

FIG. 4 represents an exemplary schematic of a webpage or other request form which the resident or other authorized party may access to submit a request for generating an access token. For instance, the invitation information 42 that can be submitted as part of the request may include, but is not limited to, the guest's name or identification information, a phone number or mobile directory number (MDN) corresponding to the guest's phone or device, an email address associated with the guest, etc. For instance, the phone number, MDN, etc. may be used as an SMS identifier in that the notification or access token presented herein may be communicated to the guest via the SMS identifier, such as the phone number or MDN.

Still referring to FIG. 4, the invitation information 42 may further include a time element or parameter 43, a location element or parameter 44, and/or a method or mode of delivering the access token to the guest 45. For instance, the time element 43 may be defined by one or more of an arrival time, a departure time, and/or a range or time window. Specifically, as described herein, the access tokens as provided in accordance with certain embodiments of the present invention include a time parameter wherein the access token is only active during the particular or defined time parameter. The time parameter may be defined by the time element 43 specified by the requesting party, for example, the arrival time, departure time, or range or time window. Other embodiments may define the time parameter of the access token as comprising a range or buffer (e.g., three (3), five (5), ten (10), etc.) minutes before and/or after the specified time element. As an example, the requesting party may identify an arrival time as ten o'clock (10:00). While some embodiments may define the time parameter of the access token in this example as ten o'clock (10:00), other embodiments may define the time parameter with a buffer allowing the access token to be active between 9:57 and 10:03, or between 9:55 and 10:05, for example.

Moreover, the location element 44 may be used to define the location parameter of the access token. In some embodiments, the location elements 44 and/or parameter may be predefined, for example, based upon the resident's or requesting party's profile. As an example, the requesting party may only have privileges to request an access token for a particular location, including, for example, the particular community in which the party belongs or lives. Accordingly, the location parameter may be predefined or preset based upon the requesting party's profile or access privileges. Other embodiments may allow the resident or requesting party to define the location element, for example, a particular vehicle gate, doorway, parking garage, etc. This may be particularly true when a single residential community has multiple vehicle gates, or when a single resident or profile has access privileges to multiple communities.

As shown at 45, certain embodiments may also allow the requesting or initiating party to specify the mode of delivering the access token or the mode of delivering a notification to the guest or visitor that an access token is available for viewing, retrieval or activation. While short message service (SMS) and email are shown as exemplary methods or modes of delivery at 45 in FIG. 4, other modes of delivery may be contemplated within the full spirit and scope of the present invention.

Figure 5:
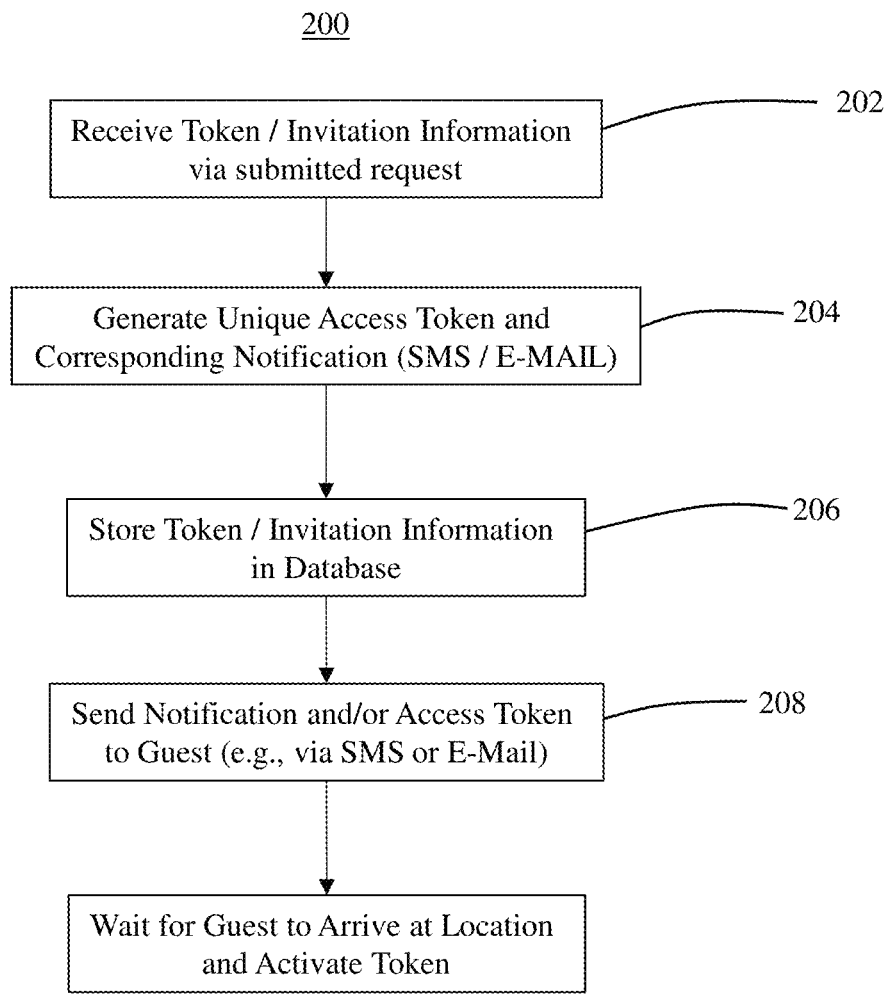
FIG. 5 is a high level flow chart illustrating the method as disclosed in accordance with at least one embodiment of the present invention.
Figure 7A:
FIG. 7A is an exemplary screenshot of a portion of an access token providing time parameters as disclosed in accordance with at least one embodiment of the present invention.
Figure 7B:
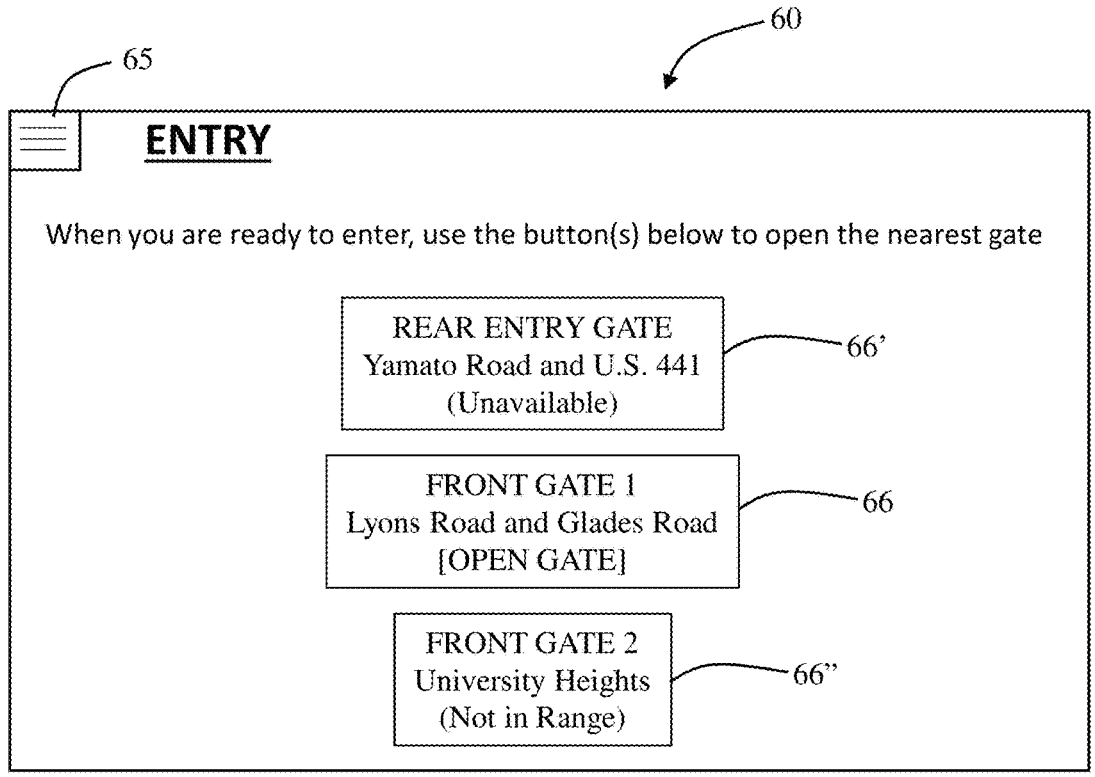
FIG. 7B is an exemplary screenshot of a portion of an access token providing activation buttons corresponding therewith.
Figure 7C:
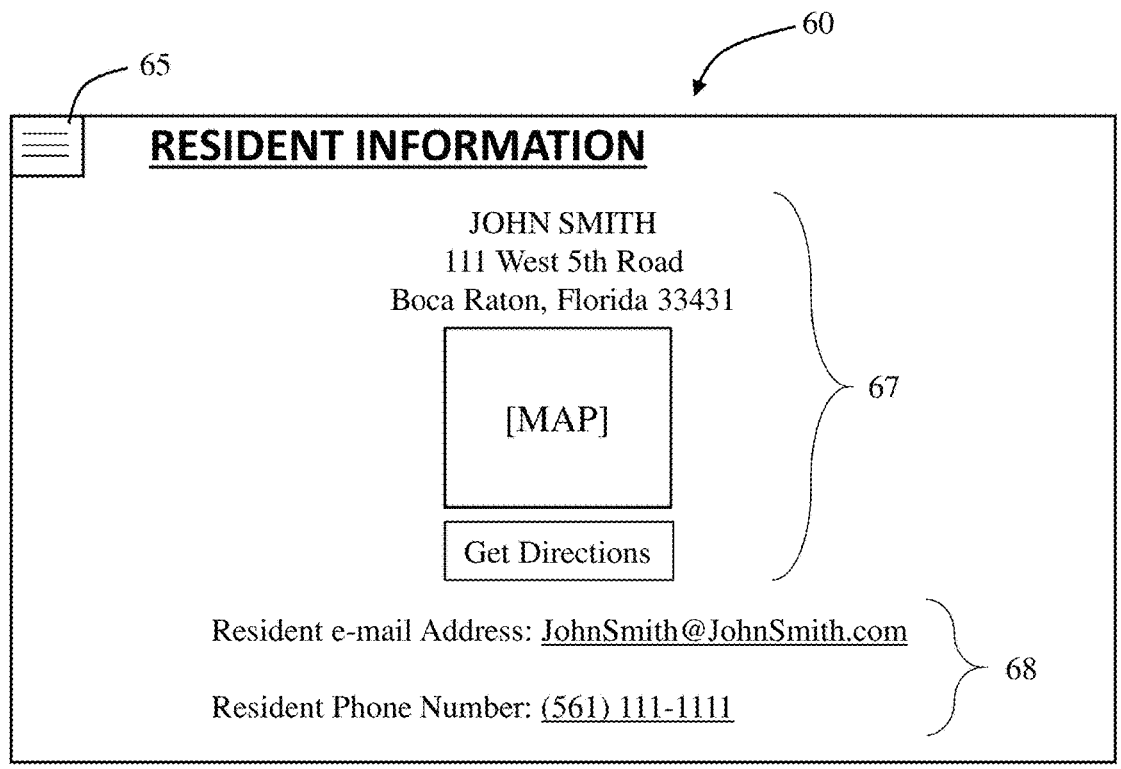
FIG. 7C is an exemplary screenshot of a portion of an access token providing a location parameter and resident information.

Upon submitting a request to create an access token, the access control management system 20 will receive the request, for example, via the network 15, as shown at 202 in the method 200 of FIG. 5. Accordingly, as shown at 204, the token generating module 21 of at least one embodiment of the present invention will generate an access token based at least in part upon the invitation information 42 contained in or as part of the request. Particularly, in at least one embodiment, the access token comprises a location parameter and a time parameter corresponding to the location element and time element of the request, as provided herein. For instance, the access token 60 (e.g., as shown in FIGS. 7A through 7C), as used herein, comprises a compilation or set of information, data, and parameters (e.g., guest information, location parameter, time parameter, URL), which, when verified by the system or method, can be used to gain access to the secure location. As provided herein, the access token may be stored in a database or other storage device and provided to the guest, for example, in the form of a dynamically generated HTML document.

For instance, generating the access token 204 in certain embodiments may also include generating a unique uniform resource locator (URL) and associating the URL with the access token or saving the URL as part of the access token. For example, the URL may be generated with random characters or with a certain amount or level of entropy such that the URL cannot be easily guessed. Systems and methods that are used to automate passwords, for example, may be used to generate at least a portion of the entropic or unique URL of at least one embodiment. The access token information, e.g., the location parameter, time parameter, and entropic or unique URL may be stored in a database, as shown at 206, for subsequent retrieval and activation.

Particularly, in at least one embodiment of the present invention, the entropic URL (e.g., the text of the URL itself) may be used to identify a guest and a password, or unique code, associated with that particular guest. For instance, the access information corresponding to a particular guest may be stored in a relational (or other) database and identified by a primary key. Along with certain access information (e.g., location parameter, time parameter, guest information, or resident information), a string or entry of random or entropic values is also generated and stored. In this regard, in at least one embodiment, the entropic URL may be generated by concatenating, intermixing, or otherwise combining the primary key (guest ID) associated with a guest and the entropic string or values (i.e. password). In order to provide further security or a greater perception of an entropic or random URL, a transposition on the buffer may also be executed.

For instance, an exemplary entropic URL of at least one embodiment of the present invention may look like this: "https://open.gate/v?ZK9FyliaLoas 1ltLg9ULdG gqfjhFBlae". The "ZK9FyliaLoasIltLg9ULdGgqfjhFBlae" portion of the exemplary URL includes the concatenated, intermixed or other combination of the primary key (guest ID) associated with the particular guest and the "password" (i.e., the entropic string or value saved within the relational database and corresponding to the primary key entry.)

Thus, when the guest clicks on or activates the link or URL, the system and method of the present invention may be structured to decode or convert the entropic portion of the URL into the guest ID or primary key and the password or random values stored in the database along with the guest information and primary key. If the password matches what is saved in the database, then the system and method validates the URL and the guest.

Figure 6:
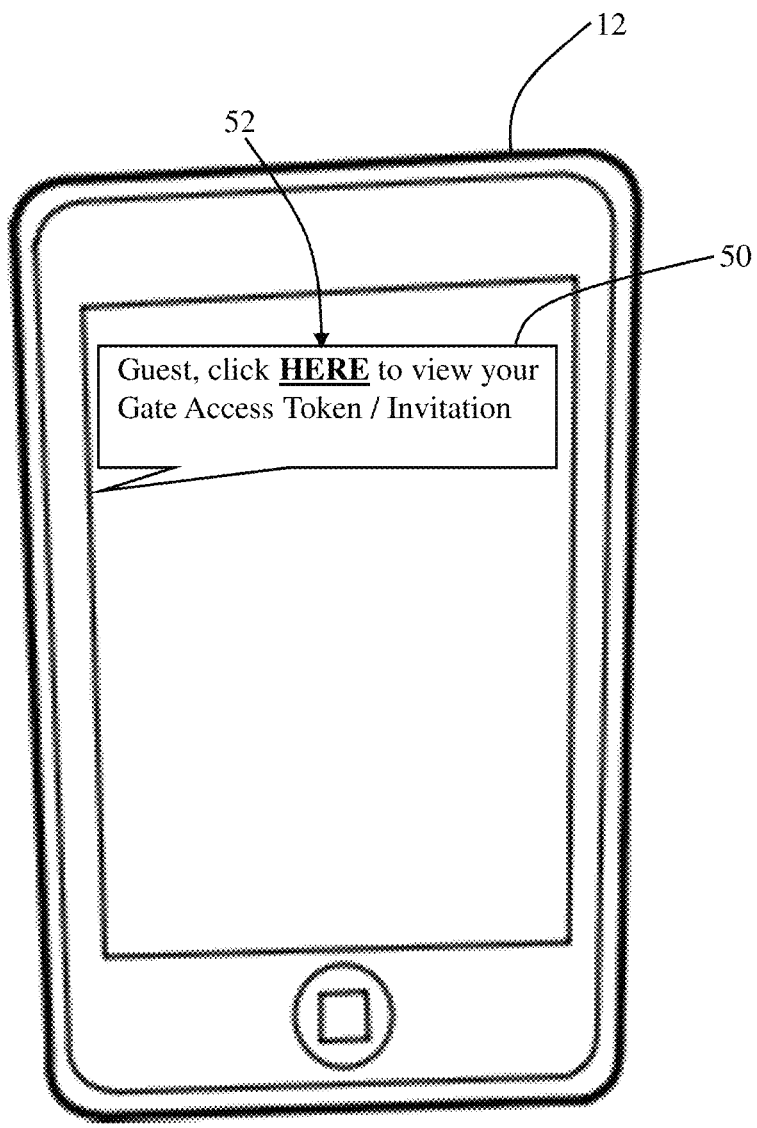
FIG. 6 is an exemplary illustration showing a notification received by the guest device in the form of an SMS message.

It should also be noted that the system 100 and method 200 of at least one embodiment may further generate a notification 50 (e.g., as shown in FIG. 6) containing the entropic or unique URL 52. The notification 50 may then be communicated 208 to the guest or guest device 12 allowing the guest to selectively retrieve or otherwise view the access token 60, for example, by activating or clicking on the URL 52.

For example, as shown in the exemplary schematic of FIG. 6, the notification 50 (including the URL) may be communicated to the guest device via text message or short messaging service (SMS). This allows the guest device 12 to use the native capabilities, e.g., the native text messaging or SMS capabilities of a smartphone or tablet, to receive the notification 50. Other embodiments may include communicating the notification 50 via email, which may also allow the guest device 12 to utilize the native communication capabilities, e.g., email capabilities, of the smartphone, tablet, etc. to view the notification. Advantageously, this means that no additional software, program or application is needed, beyond the native and common text message, SMS or email capabilities of the smartphone, tablet or other guest device 12 in order to view the notification 50 identifying the access token has been generated. It should also be noted that in certain embodiments, the access token 60 itself may be communicated to the guest device 12, for example, via text message, SMS or email, instead of the notification 50 or link to the token 60 as just described.

Figure 8:
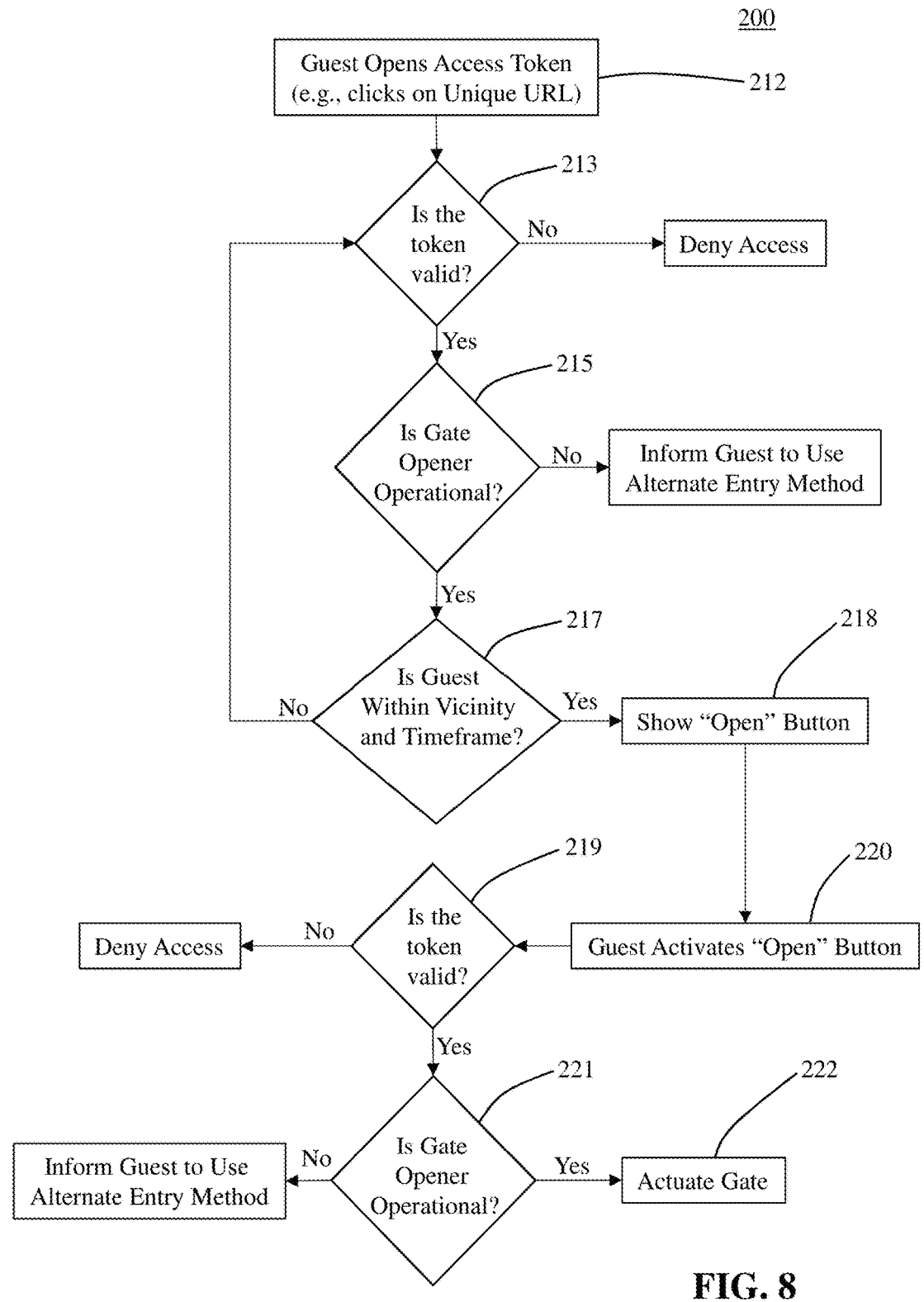
FIG. 8 is another high level flow chart illustrating the method as disclosed in accordance with at least one embodiment of the present invention.

Still referring to the example illustrated in FIGS. 6 and 7A-C, and the flow chart of the method 200 illustrated in FIG. 8, however, when the guest wants to view or retrieve the details corresponding to the access token 60, he or she may click on, select or otherwise activate the URL 52 or embedded link, for instance, as contained in the notification 50 (e.g., SMS message), and as shown at step 212. Upon doing so, in at least one embodiment, dynamically generated content displaying the access token 60, for example, in the form of HTML or other web-based content, is generated and presented to the guest via the guest device 12. For instance, upon activation of the URL 52 or unique link, the access control management system 20 may retrieve the corresponding access token 60 from a database or other storage medium, for example, as described above via the primary key and password, and dynamically display the access token 60 via HTML or other web-based content. For example, using the primary key (or unique guest ID) and password (entropic value saved with the guest ID), the system and method can query the database or otherwise obtain the guest access information relative to the particular access token, such as what community the guest is visiting, which resident invited the guest, the location and time parameters, etc. In this manner, the guest may view the access token 60 via the native capabilities of the guest device 12, for example, via a native or other web browser. Similar to viewing the notification 50, viewing the access token 60 of at least one embodiment does not require the use of or installation of additional, proprietary or third-party software, programs or applications. Rather, the guest may use the native or basic communication capabilities (e.g., text messaging or SMS capabilities, web browsing capabilities, etc.) of the device 12.

Particularly, for illustrative purposes only, FIGS. 7A, 7B and 7C show an exemplary access token 60 as disclosed in accordance with at least one embodiment of the present invention. For instance, as provided herein, the access token 60 may be presented to the guest or guest device via a web browser, although other methods of display are contemplated in certain embodiments. In particular, referring to the example shown in FIG. 7A, the access token 60 may include invitation details, such as the name of the resident 62 and an occasion or purpose 63 for the token 60. In the example shown, John Smith is the name of the resident and the purpose of the access token 60 is to celebrate John's birthday, although, of course, other residents and virtually any occasion can be specified. Still referring to FIG. 7A, the invitation or access token details may further include the time parameter 64, which specifies the time constraints relative to the access token 60, or otherwise, the time frame in which the access token 60 is valid.

If the access token information is provided on different or multiple web pages or displays, for example, as shown in FIGS. 7A through 7C, a navigation link 65 may be provided in order to allow the guest to navigate through the different portions or information relative to the access token 60. For instance, the guest may navigate between the invitation details, entry details and resident information via the navigation link 65. Other embodiments, however, may include all of the access token 60 information on a single webpage/display or different webpages/displays.

Referring now to FIG. 7B, exemplary entry details are shown. For instance, as provided herein, when the guest device is within the vicinity of the location parameter, such as via a predetermined algorithm, proximity function, or validation module, as provided herein, the guest may activate the button(s) and open the gate or unlock the door. Certain embodiments may provide multiple buttons 66, 66', 66", one for a different location, gate, or entry point. As an example, an unavailable entry point may be defined as a gate or access location that is not included in the group of valid entry points associated with the particular access token 60. Unavailable entry points may be identified as unavailable, as shown as 66', or left out all together in other embodiments. Other buttons 66" may indicate "out of range" or other equivalent to identify that the guest device is not close enough to the location parameter to activate the button 66". When the access device arrives within the vicinity, certain embodiments will automatically activate the button 66", for use by the guest, for example, as illustrated with reference to 66.

FIG. 7C illustrates further information associated with the invitation or access token 60, including, for example, the location parameter 67, such as, in the form of an address or a map. The map may be powered or provided by Google Maps™, Apple Maps™, or other external map API or service. Accordingly, the map of certain embodiments may not only show the destination location (or location parameter), but it may also identify the current location of the guest device. Resident information 68, such as the resident's email address and phone number may also be provided on the access token 60. In certain embodiments, the resident information 68 may be clicked on or activated in order to trigger native capabilities of the guest device (e.g., phone application to call the resident or email application to email the resident).

Referring back to FIG. 6, activation of the notification URL 52 or other link may, in certain embodiments, trigger one or more verification modules or authentication steps. Particularly, in at least one embodiment, the system 100 and/or method 200 of the present invention may determine whether the access token 60 is valid, as shown at 213 in FIG. 8. For instance, the resident may have previously revoked the invitation or access token, or management or residential/building security may have declined the request to create the access token. Also, if an error occurred during the request, the access token may be invalid. If, for whatever reason, the access token 60 is invalid, the method 200 will deny access to the secure location 2.

Other embodiments may also verify or determine whether the gate, lock or other device at the location 2 is operational, or determine whether the local control device 30 is operational, as shown at 215. If not, then the system 100 and/or method 200 may decline access or inform the guest to seek alternative forms of entry.

In any event, the system 100 includes one or more validation modules 23 structured to validate the time and/or location parameters associated with the access token, as generally illustrated in step 217 of FIG. 8. For instance, the time parameter may be validated or verified by analyzing or comparing the current time (as provided by the guest device 12 or as maintained by or for the access control management system 20, for example) with the time parameter associated with the access token 60. Specifically, as provided herein, in at least one embodiment, the access token 60 may only be valid during the particular time period defined by the associated time parameter. If the time parameter is not validated, for example, if the current time is outside of the time parameter associated with the access token, e.g., prior to or after the time parameter, then access will not be granted. The validation or verification of the time parameter in at least one embodiment may occur by a validation module 23 executed by or on the remote access control management system 20. This can minimize the potential for fraudulent or faked times that may be provided on the guest device. In order to maintain a level of security, the time indicated on the guest device 12 is not considered in some embodiments. Other, perhaps less secure embodiments may validate the time parameter on the device 12, itself, for example, via HTML, Java, JavaScript, C, C++ or other web-based code.

Furthermore, the various embodiments of the present invention include a validation module that is structured to determine or validate the current location of the device 12 as compared to the location parameter of the access token 60. For example, in one embodiment, the location parameter validation module may be activated upon the guest clicking on or otherwise following the entropic or unique URL 52 in the notification. As an example, doing so will not only display the access token 60 to the guest, such as via the native web browser and as shown in FIGS. 7A, 7B and 7C, but the method 200 of one embodiment will activate the native global positioning system (GPS) capabilities of the guest device 12 and, using the location parameter validation module, the system 100 and/or method 200 will determine the device's 12 proximity to the location 2.

For exemplary purposes only, in at least one embodiment, the location parameter validation module may be in the form of HTML and/or other code that is activated and processed on the device 12 itself upon selection of the URL 52. This maintains the location information of the device 12 on the device 12, meaning that the location information may not be communicated away from the device 12 in order for the system 100 and method 200 to determine whether the device is proximate the location 2. For instance, as provided below, the location parameter validation module of at least one embodiment may include or otherwise utilize the Haversine formula, as exemplified in the following code:

```
function toRad(d) {
  return d*Math.PI/180;
}
var EARTH_RADIUS=6371009; // Meters.
function distance(coords, lat, lon) {
  var d_lat=toRad(coords.latitude−lat),
  d_lon=toRad(coords.longitude−lon),
  x=0.5−Math.cos(d_lat)/2.0,
  y=Math.cos(toRad(lat))*Math.cos(toRad(coords.latitude)),
  z=(1−Math.cos(d_lon))/2.0,
  a=x+y*z;
  return (EARTH_RADIUS+coords.altitude)*2.0*Math.asin(Math.sqrt(a));
}
```

It should be noted, however, that other implementations of the location parameter validation module, whether processed on the device 12 or remotely, for example, by the remote access control management system 20, are contemplated within the full spirit and scope of the present invention. In any event, the location parameter of the various embodiments is validated or verified when it is determined by the system 100 and method 200 that the device 12 is within a predetermined proximity of the location 2.

If the location parameter and the time parameter are validated or verified, then the system 100 and method 200 of at least one embodiment will grant access to the location 2. For instance, referring to the exemplary illustration of the access token 60 provided in FIGS. 7A, 7B and 7C, and step 218 of FIG. 8, when the location parameter and the time parameter are validated or verified, then an "Open Gate," "Unlock Door" or other activation button, as generally referenced at 66 is presented, made visible, or able to be activated. Specifically, if the device 12 is proximate the location 2, and the current time is within the time parameter of the access token 60, then at least one embodiment will present the activation button 66 to the guest. Some embodiments may always show the activation button 66, regardless of the time or location of the device 12, although activation will not be valid unless and until the location and time parameters are validated or verified.

Upon activation, for example, as shown at step 220 when the guest activates or clicks upon the activation button 66, a message is communicated from the device 12 to the remote access control management system 20 identifying the unique access token 60 and the desire to open the corresponding gate or unlock the corresponding door. Some embodiments will perform a check to determine that the access token 60 is valid (step 219) and that the gate or lock is operational (step 221). For instance, in certain embodiments, the remote access management system 20 may store or maintain records corresponding to each gate or lock, and the current status of each gate and/or lock in order to inform the guest when or if the gate/lock is inoperable or out of services.

Figure 1B:
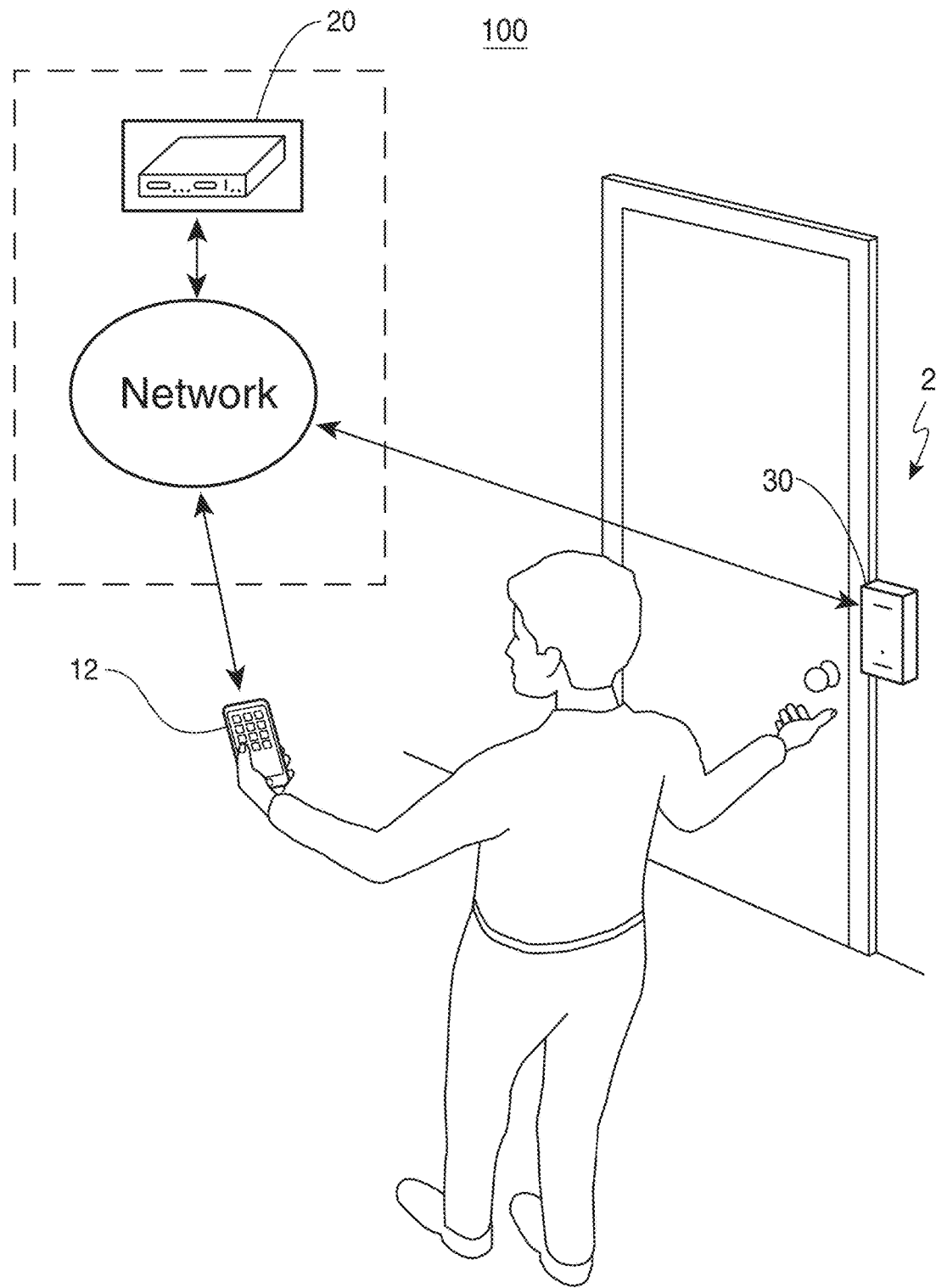
FIG. 1B is a schematic representation of the system as disclosed in accordance with another embodiment of the present invention implemented in connection with an exemplary door lock.

In any event, upon activation of the button 66, and after performance of any intervening validation steps, the remote access control management system 20 is structured to communicate an access command to the local control device 30, for example, via network 15, as shown at step 222 in FIG. 8. Particularly, the local control device comprises a computer-based device interconnected or communicatively disposed relative to the gate or operational components of the gate, for example, an access control mechanism 3 (e.g., as shown in FIG. 1A) corresponding to the gate or lock. As an example, the access control mechanism 3 (e.g., as shown in FIG. 1A) may include necessary mechanical and/or electronic components that operate to open/close the gate (e.g., by pivoting the gate upward/downward or moving the gate along tracks) or to lock/unlock a door. Upon receipt of the access command from the remote access control management system 20, the control device 30 will operate to open the gate, unlock the door, etc.

For instance, many electronic or vehicle gates as well as electronic door strikes operate via leads that, when connected, will open the gate or unlock the door for example. The local control device 30 of at least one embodiment of the present invention may be configured to drive a relay or other mechanism that controls the lead(s) and actuates the gate. Of course, other gate structures are contemplated, for example, digital control mechanisms that may control the gate. In such a case, the control device 30 of the present invention may be an external or separate device that is configured to control the digital or other control mechanism that operate the function of the gate or door, such as opening, closing, locking, unlocking, etc.

In any event, the control device 30 may be triggered or activated by a command, for example, from the access control management system 20, via an SMS message or a secured TCP/IP communication channel, including, but not limited to a secure, persistent channel or socket, etc. Thus, the control device 30 may include an Ethernet, WiFi or cellular interface for communicating with the access control management system 20. In any case, it is important in some embodiments that the access control management system 20 know whether the local control device 30 is available or unavailable on the network or communication channel. This can be accomplished via a "heartbeat" message, ping message and/or a periodic message communicated from the control device 30 to the access control management system 20 notifying the access control management system 20 that the control unit is connected and operational, or otherwise identifying the operation status of the control device 30. Thus, if a heartbeat or ping message is not received, the access control management system 20 may conclude that the control unit is unavailable, for instance, in the event of a network or hardware failure.

Furthermore, because security is important in the various embodiments of the present invention (i.e., whether SMS, TCP/IP or other communication channel is implemented between the local control device 30 and the access control management system 20), the local control device 30 may be implemented to only respond to authorized commands. For instance, in the case of implementing a TCP/IP communication channel between the local control device 30 and the access control management system 20, SSL with cryptographic authentication of the messages may be appropriate. If SMS is used as the communication channel, validating the mobile originated (MO) device and providing an embedded "key" in the message may be appropriate.

For example, the control device 30 of at least one embodiment may be functioning as a server with the function of receiving commands from the access control management system 20 and opening the gate or unlocking the door, for instance, when directed to do so. In the case of a TCP/IP communication channel between the control device 30 and the access control management system 20, the control device 30 may be assigned a static IP address such that its network address or location on the network(s) is known to the access control management system 20. However, as this approach may be undesirable in many cases, the control device 30 may be configured to continually, persistently or periodically communicate an outbound connection or signal to the access control management system 20 (rather than receive an inbound connection). In such a case, the local control device 30 need not be assigned a static IP address in order to consistently communicate with the access control management system 20 and in order for the access control management system to know the network address or location of the local control device 20. The access control management system 20 can, therefore, store or park the connection received by the control device 30, allowing the access control management system 20 to use that established connection (provided from the control device 30) when necessary, for example, when the access control management system 20 is ready to send a command. The access control management system 20 may, in some implementations, include a static IP address, such that the local control device(s) 30 can always locate it on the network 15 and send the connection signal. Thus, the control device 30 and the access control management system 20 may communicate on the secure, persistent channel established or initiated via the local control device 30.

Furthermore, as mentioned herein, to detect a communications failure, network failure or hardware failure, the control device 30 may periodically attempt to send a heartbeat or ping message to the access control management system 20 in order to test the integrity of the connection. In certain embodiments, the heartbeat or ping message may include status information relative to the control device 30 (e.g., CPU or other temperature measurements and hardware health).

If the control device 30 does not receive or detect a response to the ping message, then it will continually attempt to connect to the access control management system 20. Because the access control management system 20 may include redundancy, this should only result in a short outage as the control device 30 attempts to reconnect.

The advantage to this is the ability for the system and method to operate on low bandwidth and without the need for a static IP at the control device 30, as well. Other firewall/NAT issues are overcome.

This allows the access control management system 20 to keep track of, or otherwise maintain a steady and up-to-date status of the control device(s) 30, including temperature information and hardware health, for example, simply by receiving the ping message. If the connection is severed, or if the status of the control device 30 is poor, then the access control management system 20 can convey this information to the guest so that alternative means for entry may be sought. Additionally, in at least one embodiment, when the guest clicks on the URL to retrieve the access token, the access control management system 20 may already know the status of each of the control device(s) corresponding to the access token 60. Particularly, querying the status of the control device 30 does not need to be done at the time of activating the URL (which may result in a waste of bandwidth). Rather, the access control management system 20 of at least one embodiment is internally aware of the status of the control device(s) 30. This allows the access control management system 20 to mark certain gates or entry points as available or unavailable.

Furthermore, a single access control management system 20 or a single (set of) server(s) or computer(s), can service a plurality of gates or control devices 30 for a number of different communities. Particularly, rather than having a separate server or set of servers for each community, the present invention may be implemented with a common set of servers to manage a plurality of communities. In this manner, the access control management system 20 must have an understanding as to what guests are allowed access to what gates, which residents can invite guests through which gates, and the corresponding security barriers. For instance, a resident of community A should not be able to invite a guest into community B without being a resident of community B.

Moreover, the access token or webpage that displays the access token to the guest(s) may be customized for each community, for example. As provided above, the webpage or HTML content may be dynamically generated upon activation of the corresponding URL. Retrieving the information corresponding to the access token (e.g., guest information, location parameter, time parameter, resident information) may also include retrieval of customized community information relative to the look and feel of the webpage. The community information may thus include selected colors, names, logos, a particular layout, etc. This allows each community to customize the access tokens and web interface with their colors and logos, for example, despite sharing a server or set of servers with hundreds or even thousands of other communities.

In addition, certain control parameters, including, for example, a relay closure time parameter, may be stored on or by the remote access control management system 20 or otherwise provided by the remote access control management system 20 to the local control device 30. Particularly, oftentimes, various control parameters, such a relay closure time, are required to effectively operate the controlled opening and closing of the gate, and may vary depending on a particular gate or lock configuration. Accordingly, rather than storing certain control parameters locally on the control device 30, they may be stored on the access control management system 20 and communicated to the control device 30, for example, with the activation command. Specifically, with regard to the relay closure time, this allows the length of time in which the gate/door remains open or unlocked to be controlled by the remote access control management system 20. It also allows the system 100 and method 200 of the various embodiments to be implemented in a number of different applications, such as vehicle gates, vehicle garage gates, electronic door strikes, lobby doors, etc. Furthermore, the control device 30 does not need to be reconfigured if it is damaged, for example, and universal control devices 30 may be used to control vastly different gates, lock, etc. In addition, the control parameters can be changed remotely at any time, without requiring on-site servicing of the control device 30. Maintaining the control parameters on the access control management system 20 also allows the parameters to be easily backed-up—a failure in storage device, either by the control device 30 or the access control management system 20, therefore, does not mean all of the control parameters are lost.

Further advantages of at least one embodiment of the present invention includes a hierarchically implemented database structure in which a group of guests can be managed by the resident as a single unit, which can be useful for parties, group gatherings, for instance. As an example, the database hierarchy of at least one embodiment may be implemented by defining a "community" that contains one or more "residents," a "resident" owns zero or more "invitations" or tokens, an "invitation" contains one or more "guests," and a "guest" contains zero or more "records."

Thus, a single "community" may be defined as including a plurality of residents, each of which can manage invitations for guests. A single invitation may be assigned to a plurality of different guests. This is what allows the resident to easily define or manage group invitations. For instance, each defined guest may activate the invitation or access token during the defined time parameter and within the defined location parameter. The resident may thus define a single time and location parameter which may apply to a plurality of different guests.

It should be noted that while the system 100 and method 200 of the exemplary embodiments provided herein are at least partially implemented or accessed via native capabilities of a guest device (e.g., smartphone or tablet), certain embodiments may be implemented using a downloaded application structured and designed to operate the various steps and functionality of the present invention.

This written description provides an illustrative explanation and/or account of the present invention. It may be possible to deliver equivalent benefits and insights using variations of the sequence, steps, specific embodiments and methods, without departing from the inventive concept. This description and these drawings, therefore, are to be regarded as illustrative and not restrictive.

Now that the invention has been described,

What is claimed is:

1. A method for verified admission through an access controlled location, the method comprising:
   receiving a request at a remote access control management system to create a guest access token for admission through the access controlled location, the guest access token comprising a location parameter and a time parameter, the remote access control management system comprising a computer processor, memory, a storage device and a communication module, the request being initiated by a resident of a residential community for a guest to be admitted into the residential community,
   generating the guest access token and storing the guest access token at the remote access control management system,
   communicating a notification to a guest device, the notification comprising a uniform resource locator (URL) for allowing selective retrieval of the guest access token, wherein a portion of the URL comprises an encoded value, and wherein upon selective activation of the URL at the guest device, the encoded value portion of the URL is decoded to determine a guest ID and a uniquely generated entropic value, the guest ID and the uniquely generated entropic value is used to retrieve the guest access token from the remote access control management system,
   validating the time parameter of the guest access token prior to granting access to the controlled location,
   validating the location parameter of the guest access token on the guest device prior to granting access to the controlled location using location capabilities of the guest device to determine that the guest device is disposed within a proximate range of the access controlled location, and
   granting access to the controlled location by communicating an access command from the remote access control management system to a control device at the access controlled location, wherein the guest access token is only valid for the corresponding location and time parameters such that access through the access controlled location is not granted if at least one of the location and time parameters are not validated,
   wherein access to the controlled location is only granted upon communication of the access command to the control device from the remote access control management system such that access cannot be granted via any direct communication or interaction from the guest or the guest device to the control device, and
   periodically communicating a status signal from the control device at the access controlled location to the remote access control management system, the status signal comprising status information associated with the control device,
   determining, at the remote access control management system, if the control device is available or unavailable for entry, and
   if the control device is unavailable for entry, communicating information from the remote access control management system to the guest device identifying that the control device is unavailable in order for the guest to seek an alternative manner of entry.

2. The method as recited in claim 1 further comprising defining the guest device as comprising a personal electronic device, wherein receiving the notification for selective retrieval of the guest access token and retrieval of the guest access token by the guest device utilizes native capabilities of the guest device.

3. The method as recited in claim 2 further comprising defining the native capabilities of the guest device as comprising a native web browser, native messaging capabilities, and a native global positioning system.

4. The method as recited in claim 1 wherein communicating the notification to the guest device for selective retrieval of the guest access token comprises communicating a short messaging service (SMS) message to the guest device, the SMS message comprising the unique uniform resource locator corresponding to the guest access token.

5. The method as recited in claim 1 wherein communicating the notification to the guest device for selective retrieval of the guest access token comprises communicating an e-mail message to the guest device, the e-mail message comprising the unique uniform resource locator corresponding to the guest access token.

6. The method as recited in claim 1 further comprising validating the time parameter at the remote access control management system by determining that a current time is within a time range defined by the time parameter.

7. The method as recited in claim 6 further comprising upon validating the location and the time parameters, providing an activation link for activating admission through the controlled access location.

8. The method as recited in claim 7 further comprising upon receiving activation of the activation link via the guest device, validating the time parameter of the guest access token at the remote access control management system and then communicating the access command to the control device.

9. The method as recited in claim 1 further comprising establishing a secure, persistent communication channel between the control device and the remote access control management system for communication of the access command from the remote access control management system to the control device, without the control device being assigned a static IP address.

10. The method as recited in claim 9 wherein the secure, persistent communication channel is initiated via the status signal from the control device to the remote access control management system, and the method further comprises periodically storing, at the remote access control management system, information corresponding to the secure, persistent communication channel initiated by the status signal from the control device.

11. A system for verified admission through an access controlled location, said system comprising:
   a local computer-based control device communicatively connected to an access control mechanism,
   a remote access control management system comprising a computer processor, memory, storage device and communication module, said remote access control management system being disposed in a communicative relation with a network for communication with a guest device and said local computer-based control device,
   a token generating module at said remote access control management system for receiving a request to create a guest access token and for generating said guest access token, said guest access token comprising a location parameter and a time parameter,
   said remote access control management system being structured to communicate a notification to the guest device for selective retrieval of said guest access token, said notification comprises a uniform resource locator (URL), wherein a portion of said URL comprises an encoded value, and wherein, upon selective activation of said URL at the guest device, said encoded value portion of said URL is decoded to determine a guest ID and a uniquely generated entropic value, wherein said guest ID and said uniquely generated entropic value is used to retrieve said guest access token from said remote access control management system,
   a location validation module for processing and validating said location parameter of said guest access token on the guest device,
   a time validation module for processing and validating said time parameter of said guest access token,
   said remote access control management system being structured to communicate an access command to said local computer-based control device upon validation of said location parameter and said time parameter, wherein access through said access controlled location is not granted if at least one of said location parameter or said time parameter is not validated,
   said local computer-based control device being structured to activate the access control mechanism only upon receipt of said access command from said remote access control management system for providing admission through the access controlled location, wherein neither a guest nor the guest device communicate or interact directly with the control device,
   wherein said local computer-based control device communicates a status signal to said remote access control management system, said status signal comprising data representing an operational status of the local computer-based control device, and wherein said remote access control management system is structured to communicate a status of said local computer-based control device to the guest device, said status being based upon said status signal communicated from said local computer-based control device and wherein said status represents if the local-computer based control device is available or unavailable for entry.

12. The system as recited in claim 11 wherein said notification comprises a short messaging service (SMS) message and the guest device comprises a mobile electronic device.

13. The system as recited in claim 11 wherein said notification comprises an email message and the guest device comprises a mobile electronic device.

14. The system as recited in claim 11 wherein said guest access token is retrieved via a web browser by activating said URL, and wherein activation of said URL displays an availability status of a gate corresponding to the local computer-based control device.

15. The system as recited in claim 11 wherein said status signal from said local computer-based control device is structured to initiate a persistent communication channel with said remote access control management system for periodically establishing a network address of said computer-based control device on a network.

16. The system as recited in claim 11 wherein said remote access control management system comprises a hierarchal storage configuration, said hierarchal storage configuration being structured to define: a community field as comprising one or more resident fields, said resident fields each comprising zero or more guest access token fields, and said guest access token fields each comprising one or more guest fields.

* * * * *